United States Patent
Brezger et al.

(10) Patent No.: US 10,851,853 B2
(45) Date of Patent: Dec. 1, 2020

(54) FREEWHEEL

(71) Applicant: BorgWarner Inc., Auburn Hills, MI (US)

(72) Inventors: Friedrich Philipp Brezger, Karlsruhe (DE); Oliver Groneberg, Waldsee (DE)

(73) Assignee: BorgWarner Inc., Auburn Hills, MI (US)

( * ) Notice: Subject to any disclaimer, the term of this patent is extended or adjusted under 35 U.S.C. 154(b) by 48 days.

(21) Appl. No.: 15/995,716

(22) Filed: Jun. 1, 2018

(65) Prior Publication Data

US 2018/0347644 A1 Dec. 6, 2018

(30) Foreign Application Priority Data

Jun. 1, 2017 (DE) .................. 10 2017 005 249

(51) Int. Cl.
*F16D 41/06* (2006.01)
*F16D 41/12* (2006.01)
*F16D 41/069* (2006.01)

(52) U.S. Cl.
CPC ........... *F16D 41/12* (2013.01); *F16D 41/069* (2013.01); *F16D 2041/0603* (2013.01)

(58) Field of Classification Search
CPC . F16D 41/12; F16D 41/069; F16D 2041/0603
See application file for complete search history.

(56) References Cited

U.S. PATENT DOCUMENTS

| 2,113,512 A | 4/1938 | Kesterton |
| 2,291,151 A | 7/1942 | Dunn |
| 3,589,486 A | 6/1971 | Kelch |
| 5,257,685 A | 11/1993 | Tichiaz et al. |

(Continued)

FOREIGN PATENT DOCUMENTS

| AT | 123023 B | 5/1931 |
| CH | 301095 A | 8/1954 |

(Continued)

OTHER PUBLICATIONS

Machine-assisted English translation for AT 123 023 extracted from espacenet.com database on May 29, 2019, 5 pages.

(Continued)

*Primary Examiner* — David J Hlavka
(74) *Attorney, Agent, or Firm* — Howard & Howard Attorneys PLLC

(57) ABSTRACT

The present invention relates to a freewheel (20) comprising a first race (22), a second race (24) rotatable relative to the first race (22) in a first direction of rotation (70), and clamping elements (32) between the first and second race (22, 24) which are in rotary driving connection with the first race (22), wherein, in a second direction of rotation (72) opposite the first direction of rotation (70), the second race (24) is coupled in a rotary entrainment way to the first race (22) in a relative rotation position via at least one of the clamping elements (32). The at least one clamping element (32) is displaceable in axial direction (6) from an initial position into a disengagement position by changing the relative rotational position between the first and second race (22, 24).

12 Claims, 5 Drawing Sheets

(56) References Cited

U.S. PATENT DOCUMENTS

Figure 1:
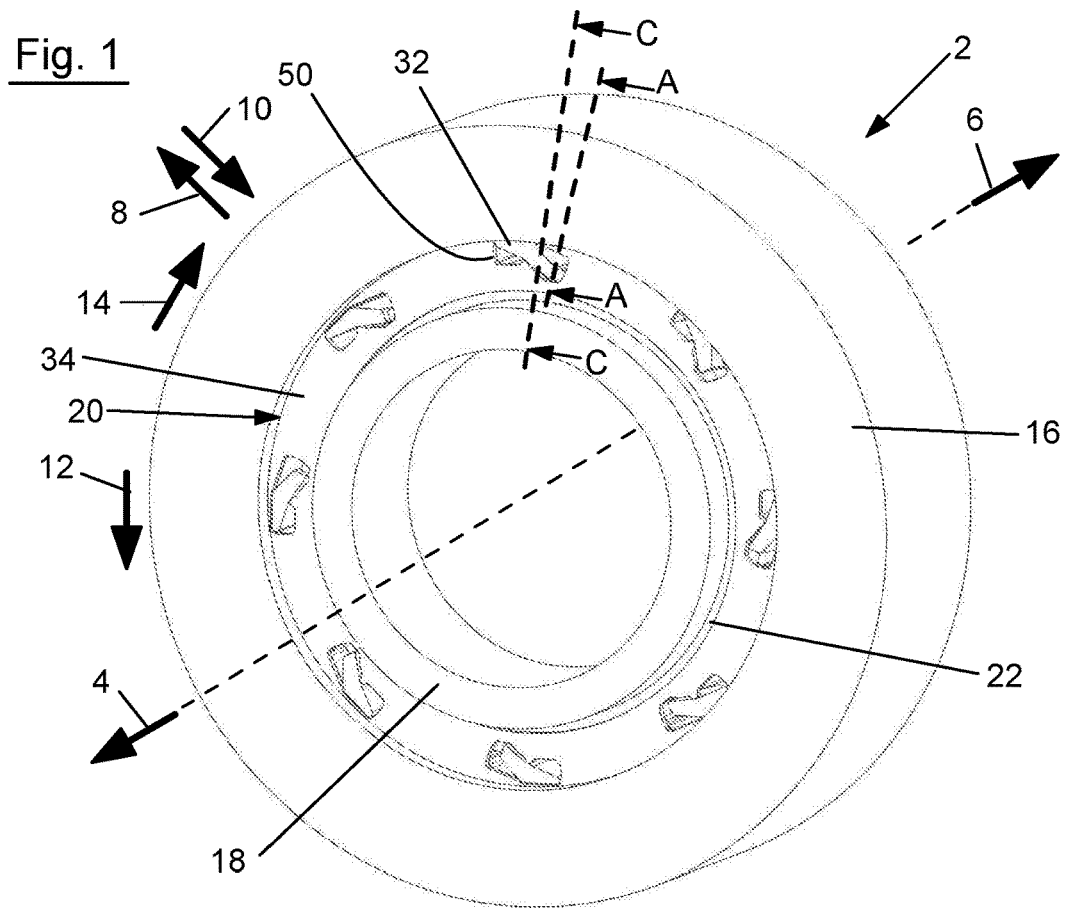

| | | | |
|---|---|---|---|
| 5,590,550 A | 1/1997 | Savkar et al. | |
| 8,272,488 B2 * | 9/2012 | Eisengruber | F16D 41/12 192/114 R |
| 8,276,725 B2 | 10/2012 | Swales et al. | |
| 8,286,772 B2 * | 10/2012 | Eisengruber | F16D 41/14 192/43.1 |
| 9,151,339 B2 * | 10/2015 | Lee | F16D 21/00 |
| 9,163,678 B2 | 10/2015 | Strong | |
| 9,726,236 B2 | 8/2017 | Papania | |
| 2002/0027055 A1 * | 3/2002 | Le-Calve | F16D 41/185 192/46 |
| 2010/0181157 A1 | 7/2010 | Smetana | |
| 2013/0248317 A1 * | 9/2013 | Lee | F16D 13/40 192/70.11 |
| 2015/0323020 A1 * | 11/2015 | Papania | F16D 41/16 74/665 GE |

FOREIGN PATENT DOCUMENTS

| | | |
|---|---|---|
| CH | 318951 A | 1/1957 |
| CN | 104981623 A | 10/2015 |
| DE | 102004047803 A1 | 3/2006 |
| DE | 102013219880 B4 | 9/2015 |
| DE | 112014002308 T5 | 3/2016 |
| EP | 2951456 B1 | 11/2017 |
| WO | 2014120595 A1 | 8/2014 |

OTHER PUBLICATIONS

Machine-assisted English translation for CH 301 095 extracted from espacenet.com database on May 29, 2019, 8 ages.

Machine-assisted English translation for CH 318 951 extracted from espacenet.com database on May 29, 2019, 7 pages.

English language abstract for CN 104981623 extracted from espacenet.com database on Jun. 3, 2019, 2 pages.

Machine-assisted English language abstract and machine-assisted English translation for DE 10 2004 047 803 extracted from espacenet.com database on May 10, 2019, 9 pages.

Machine-assisted English language abstract and machine-assisted English translation for DE 10 2013219880 extracted from espacenet.com database on May 10, 2019, 12 pages.

English language abstract for DE 11 2014 002 308 extracted from espacenet.com database on May 10, 2019, 1 page.

U.S. Appl. No. 16/408,793, filed May 20, 2019, 45 pages.

* cited by examiner

FREEWHEEL

CROSS-REFERENCE TO RELATED APPLICATIONS

This application claims the benefit of German Patent Application No. 102017005249.2 filed Jun. 1, 2017, the disclosure of which is herein incorporated by reference in its entirety.

DESCRIPTION

The present invention relates to a freewheel comprising a first race, a second race rotatable relative to the first race in a first direction of rotation, and a clamping element between the first and second races, said clamping element being in rotary driving connection with the first race, wherein, in a second direction of rotation opposite the first direction of rotation, the second race is coupled in a rotary entrainment in a rotational position relative to the first race via at least one of the clamping elements.

Freewheels, like, for example, ratcheting freewheels, are known from the prior art. These have a first race, thus, for example, an outer or inner race, and a second race, thus, for example, an inner or outer race, wherein the second race is rotatable in a first direction of rotation relative to the first race. Clamping elements, thus, for example, clamping rollers, are provided between the first and second races, which are in rotary driving connection with the first race. If the second race is rotated relative to the first race in a second direction of rotation opposite the first direction of rotation, then the second race is coupled in a rotary entrainment to the first race via at least one of the clamping elements, wherein the two races assume a rotational position relative to one another.

In the known freewheels, in particular in the so-called positive-locking clutches or ratchet freewheels, it has been demonstrated that the rotary entrainment coupling in the specified relative rotational position is not carried out via all clamping elements; instead, due to manufacturing tolerances related to the clamping elements and/or the races, at most only a few or even only one single clamping element is involved, so that individual clamping elements and the races in the respective areas, in which the clamping element is supported, are particularly heavily loaded. This may lead to damage to the heavily-loaded clamping element and the respective support area on the race. To address this problem, in the past, correspondingly large and strong clamping elements and races were used, which were also mostly made from a higher-quality material, which ultimately led to an over-dimensioning of the freewheel and increased manufacturing costs.

It is therefore the object of the present invention to refine a freewheel of the generic type so that it may dimensioned relatively small, while damage to the freewheel may largely be prevented.

This problem is solved by the features listed in Claim 1. Advantageous embodiments of the invention are the subject matter of the subclaims.

The freewheel according to the invention, which is preferably designed as a positive-locking clutch or ratchet freewheel, has a first race and a second race. The first race may, for example, be an outer or inner race, whereas the second race may be, for example, an inner or outer race. Clamping elements, thus, for example, clamping rollers, clamping bodies, ratchets, or pawls, are arranged between the first and second races, wherein said clamping elements are preferably arranged in the radial direction between the first and second races. The clamping elements are thereby in rotary driving connection with the first race of the freewheel. The clamping elements are thereby arranged between the first and second races in such a way that the second race is rotatable in a first direction of rotation relative to the first race such that no rotary entrainment coupling exists between the first and second races when the second race is rotated in the first direction of rotation relative to the first race. The first direction of rotation may also be designated as a first relative direction of rotation of the second race with respect to the first race. In addition, the clamping elements are provided between the first and second races in such a way that the second race, upon a rotation of the same relative to the first race in a second direction of rotation opposite to the first direction of rotation, is coupled in a rotary entrainment to the first race via at least one of the clamping elements, wherein the first and second race assume a rotational position relative to one another upon achieving this rotary entrainment coupling. The second direction of rotation opposite the first direction of rotation may also be designated as a second relative direction of rotation of the second race with respect to the first race. To prevent that only individual clamping elements, or indeed only one clamping element (caused manufacturing tolerances in the races or the clamping elements), contribute(s) to the rotary entrainment coupling and thus being particularly strongly loaded, the at least one clamping element, preferably all clamping elements, may be displaced in an axial direction from an initial position into a disengagement position by changing the relative rotational position between the first and second race. By changing the relative rotational position between the first and second races in the rotary entrainment coupling, said manufacturing tolerances in the clamping elements and in the races may be compensated for, so that, in addition to the clamping element displaced into the disengagement position, additional clamping elements contribute to the rotary entrainment coupling and thus, not only is the previously mentioned clamping element unloaded, but a uniform rotary entrainment coupling is effected. As the load may be uniformly distributed in this way on multiple or indeed all clamping elements, both the clamping elements and also the races may be dimensioned as correspondingly smaller. Damage to the clamping element and the races is largely excluded in this way, while a comparatively compact design may be achieved.

Basically, a controller may be assigned to the freewheel, which causes the displacement of the at least one clamping element from the initial position into the disengagement position in order to achieve the specified advantages. However, in order to be able to create a particularly simple and installation space saving freewheel, in one preferred embodiment of the freewheel according to the invention, the at least one clamping element is displaceable in a self-actuating way into the disengagement position. In this way, the possibly present manufacturing tolerances may be compensated for in a self-actuating way during operation, without the necessity of a controlled engagement from an external source.

In one particularly preferred embodiment of the freewheel according to the invention, the at least one clamping element is displaceable into the disengagement position due to a support force acting on the one side between the first and/or second race and on the other side on the clamping element, in order to effect an self-actuating displacement of the clamping element into the disengagement position. Consequently, the support force, which is already acting in the specified relative rotational position between the first and/or second race and the clamping element, is used to effect the displacement of the at least one clamping element.

In another preferred embodiment of the freewheel according to the invention, to cause the self-actuating displacement of the at least one clamping element, a support section of the clamping element is supported or supportable on a support section of the first and/or second race, wherein the support sections are aligned and/or inclined in such a way that support force acting in the direction of rotation between the clamping element and the respective race results partially in an axial force acting on the clamping element to displace the clamping element into the disengagement position. The most varied of inclined positions, slopes, or the like of the support sections are hereby possible to derive an axial force from the support force, said axial force functioning to displace the clamping element into the axial direction. To thereby prevent high surface pressures, and thus to guarantee low-wear operation, the support sections are preferably supported or supportable flat against one another, wherein the flat support or supportability is to be provided both in the initial position and also in the disengagement position of the clamping element to prevent wear on the interacting support sections due to large, or merely point or linear, loads.

In one advantageous embodiment of the freewheel according to the invention, a spring device is provided for biasing the clamping element into the initial position and/or the clamping element is displaceable counter to the spring force of the spring device from the initial position into the disengagement position. This may also generally be designated as a reset device. In the case of multiple displaceable clamping elements, a separate spring device might be assigned to each individual clamping element; however, it is preferred in this case if the clamping elements are biased into the initial position by a common spring device and/or are displaceable counter to a spring force of the common spring device from the initial position into the disengagement position. A spring device has proven particularly advantageous herein, which has an annular wave spring or multiple annular wave springs combined with one another.

According to another advantageous embodiment of the freewheel according to the invention, the spring device is supported or supportable on one side on the clamping element in the axial direction and on the other side directly or indirectly on the first race. The indirect support may be thus be carried out preferably via other parts of a freewheel arrangement, which are in rotary driving connection with the first race or are connected rotationally fixed on the same.

In order to achieve a particularly compact design of the freewheel, the spring device has at least one annular wave spring. Such a wave spring may have, for example, multiple wave peaks projecting in the direction of the clamping elements and multiple wave troughs facing away from the clamping elements. It has also proven advantageous if the spring device has multiple annular wave springs. In addition, it has been proven advantageous in the case of multiple wave springs of the spring device, if, in the case of at least two wave springs of the spring device, the wave peaks are assigned to the wave peaks and the wave troughs to the wave troughs, and/or in the case of at least two wave spring, the wave peaks are assigned to the wave troughs and the wave troughs to the wave peaks. In the latter case, the wave springs are analogously phase offset to one another.

In another advantageous embodiment of the freewheel according to the invention, a wave peak of the wave spring projecting in the direction of the clamping element is assigned to the at least one clamping element and/or is supported on the same. In the case of multiple displaceable clamping elements and a common spring device in the form of one or more wave springs, a respective wave peak of the wave spring is assigned to a respective displaceable clamping element and/or is supported or supportable on the same.

According to another advantageous embodiment of the freewheel according to the invention, the wave spring(s) of the spring device is/are in rotary driving connection with the first race. The rotary driving connection may also be carried out here directly or indirectly.

In one particularly advantageous embodiment of the freewheel according to the invention, the second race is additionally displaceable in an axial direction relative to the first race from a first axial position into a second axial position due to a support force acting in the direction of rotation between the second race and the clamping element, thus is preferably displaceable relative to the first race in the axial direction. Consequently, the support force already acting between the second race and the clamping element causes not only a displacement of the clamping element from the initial position into the disengagement position, but also additionally causes a displacement of the second race in the axial direction from an initial axial position into a second axial position. The axial force, resulting from the support force and acting in this context on the second race, may analogously correspond to the axial force acting on the clamping element; however, this acts in the opposite direction. Due to the displaceability of the second race from the first axial position into the second axial position, the load of a component in rotary driving connection with the second race, for example, a subsequent hub, may be particularly reduced. Thus, it is particularly preferred in this embodiment if the second race is supported or supportable in the axial direction directly or indirectly on the first race in the second axial position, in order that the axial force acting on the second race does not have to be supported, or not completely supported, on the subsequent component, like the hub. The indirect support of the second race on the first race may thereby be carried out via a component in rotary driving connection with the first race, for example, a side wall of the freewheel described later in detail.

In order to carry out a simple resetting in the case of a displaceable second race, in another advantageous embodiment of the freewheel according to the invention, the second race is biased into the first axial position and/or is displaceable counter to the spring force of another spring device from the first axial position into the second axial position.

As already previously indicated, in another advantageous embodiment of the freewheel according to the invention, the second race is displaceable from the first axial position into the second in the opposite axial direction as the at least one clamping element, i.e., the clamping element is displaceable in a first axial direction from the initial position into the disengagement position, whereas the second race is simultaneously displaceable in an opposite second axial direction from the first axial position into the second axial position.

In order to avoid applying the axial forces acting on the at least one clamping element and the second race to the components that may be brought into rotary driving connection with one another via the freewheel or freewheel arrangement within a drivetrain, and thus to dispense with a structural adaptation of the said components, the axial force acting on the at least one clamping element in the disengagement position and the axial force acting in the opposite direction on the second race in the second axial position cancel out in a force circuit. This force circuit thereby preferably leads through the first race and/or the spring device assigned to the clamping element.

In another advantageous embodiment of the freewheel according to the invention, the first and second race assume a first rotational position relative to one another in the initial position of the at least one clamping element, and a second rotational position relative to one another in the disengagement position of the at least one clamping element, wherein the second race is rotated farther in the second direction of rotation in the second relative rotational position with respect to the first race than in the first relative rotational position.

In another preferred embodiment of the freewheel according to the invention, the freewheel is designed as a ratchet freewheel, wherein the clamping elements are preferably formed by pawls which are pivotable between a release position into a locking position in which the pawls engage in a rotary driving contour on the second race, and are particularly preferably biased into the locking position. The biasing may be carried out, for example, via a spring element which is assigned to the respective pawl and/or merely applies a low spring force. It is also preferred in this embodiment if the pawl is supported like a rocker on a projecting shoulder or projection to enable its pivotability.

To achieve a particularly simple design of the freewheel designed as a ratchet freewheel, in another preferred embodiment of the invention, the pawls are arranged between two axially opposite side walls, which are connected rotationally fixed to the first race, wherein the pawls extend in the axial direction in recesses in the side walls in which recesses the pawls are arranged to be pivotable and axially displaceable. The edge of the recess is thereby preferably designed in such a way that it forms a projecting shoulder into the recess on which shoulder the pawl is supported or supportable while achieving pivotability, if necessary, in a radial direction.

In another advantageous embodiment of the freewheel according to the invention, the previously mentioned displaceable second race is supported or supportable in an axial direction on one of the side walls in its second axial position, between which side walls the pawls are arranged.

Figure 2:
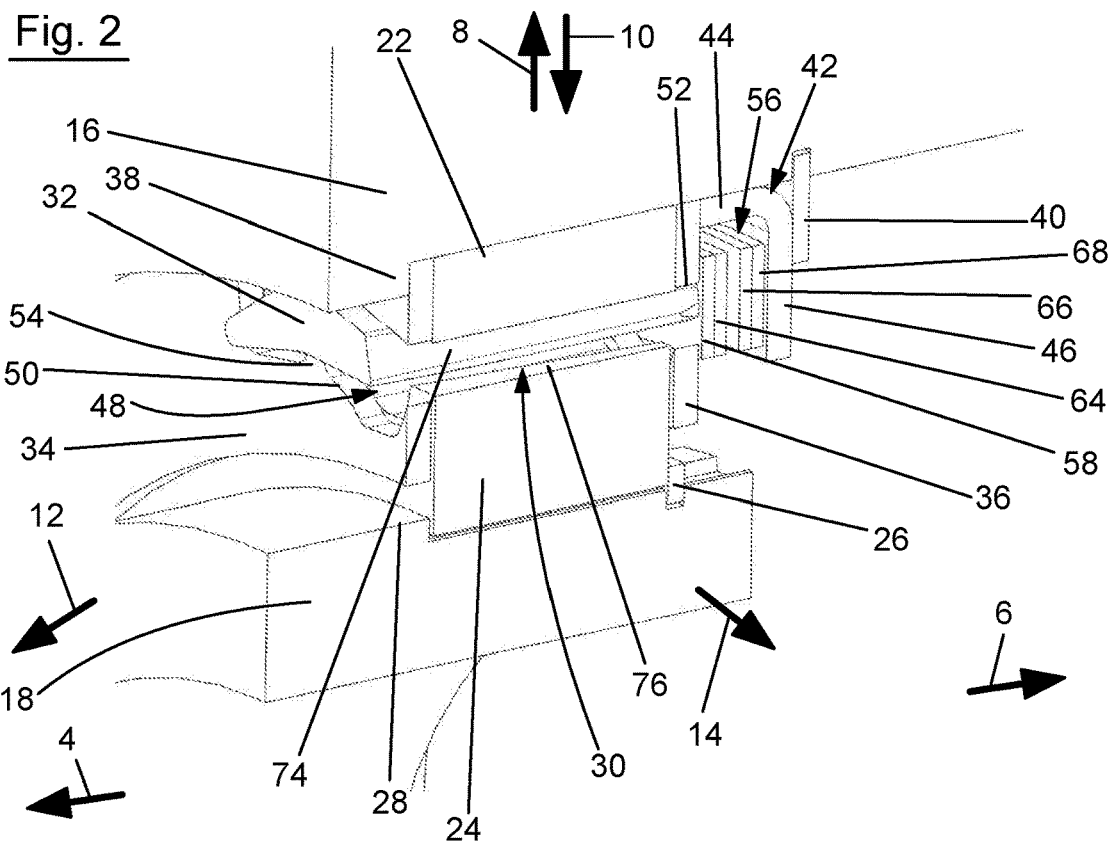
Figure 3:
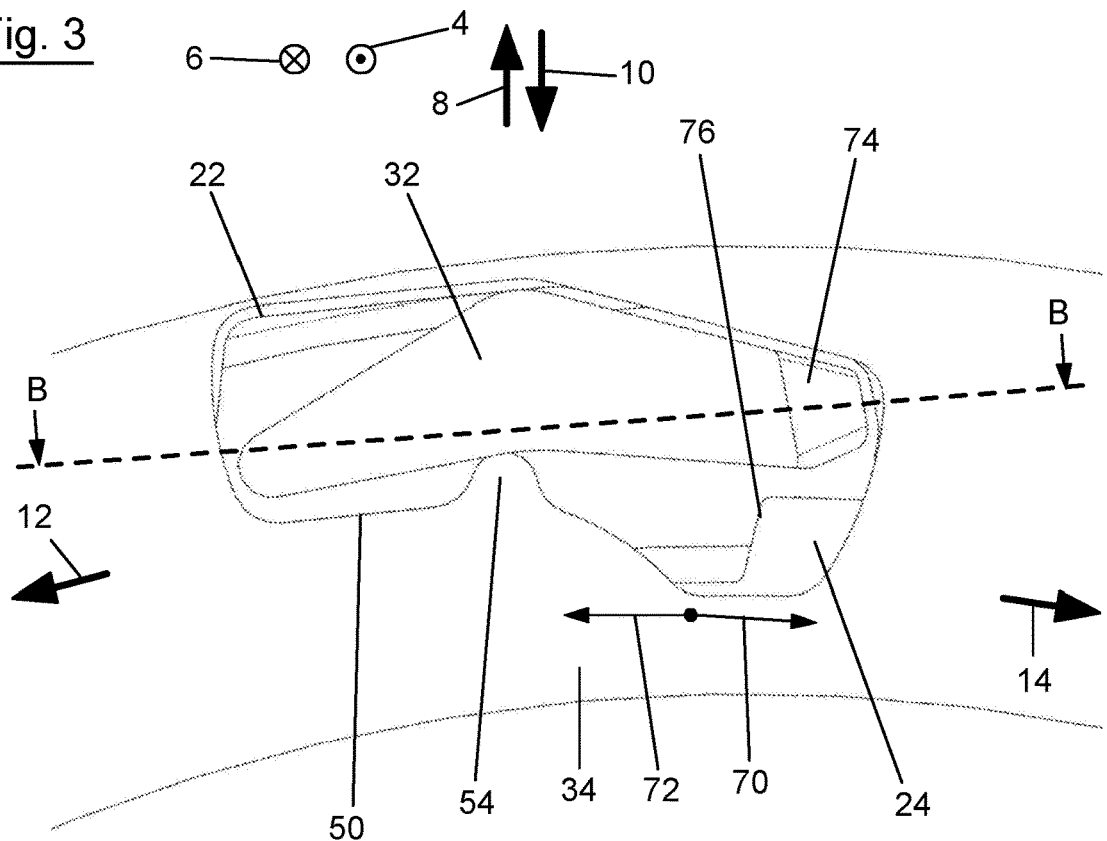
Figure 4:
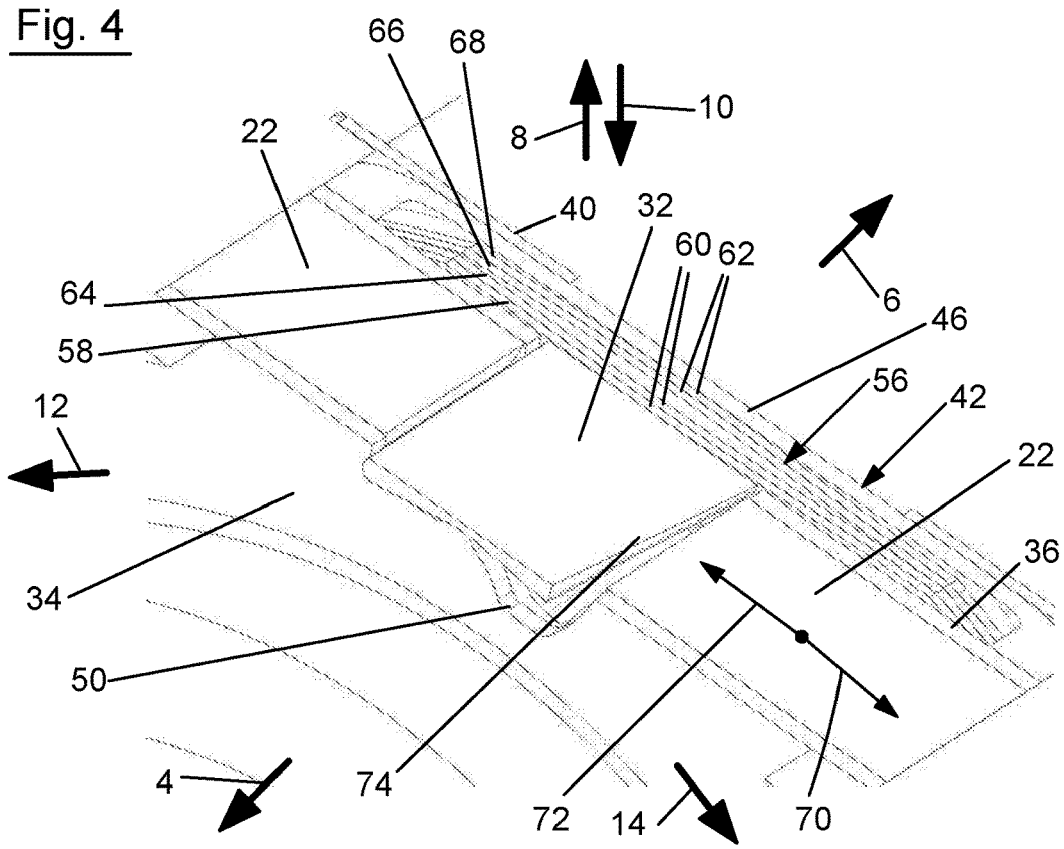
Figure 5:
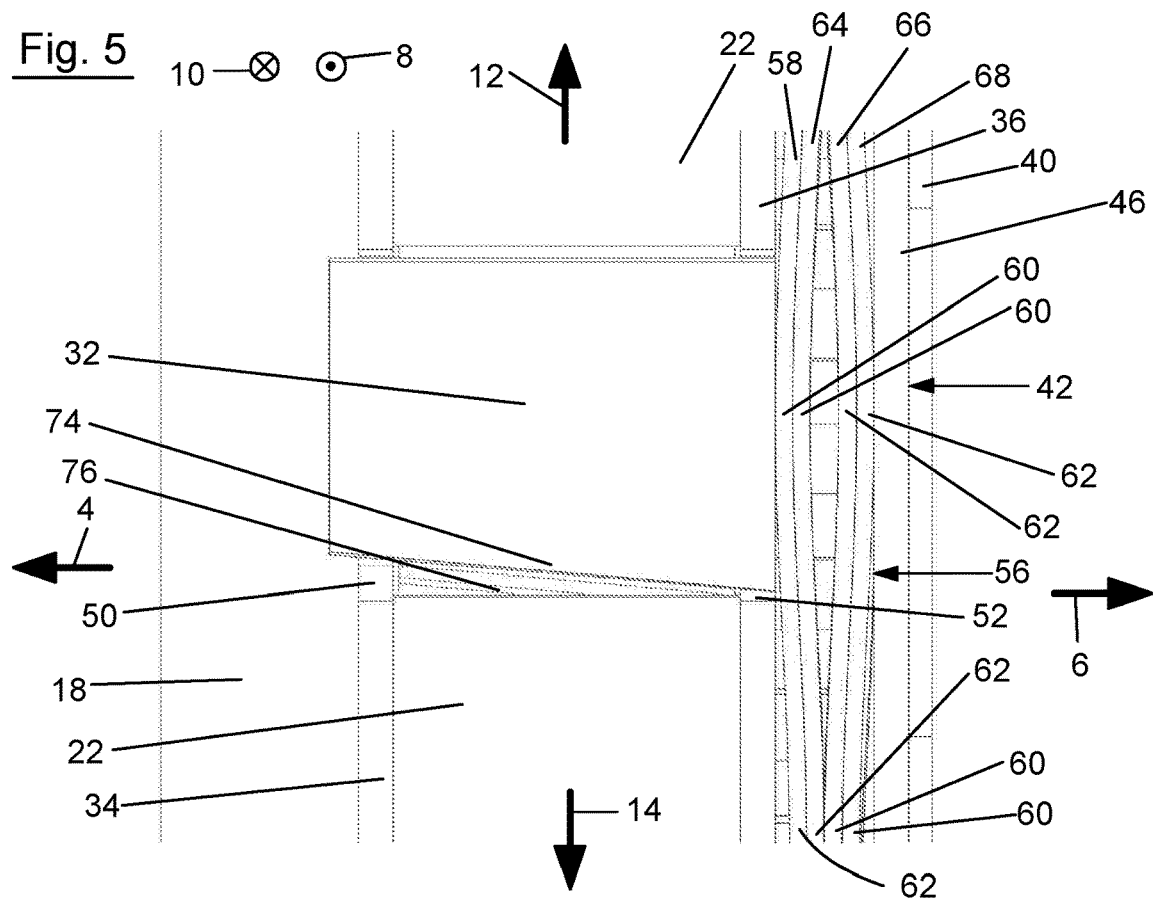
Figure 6:
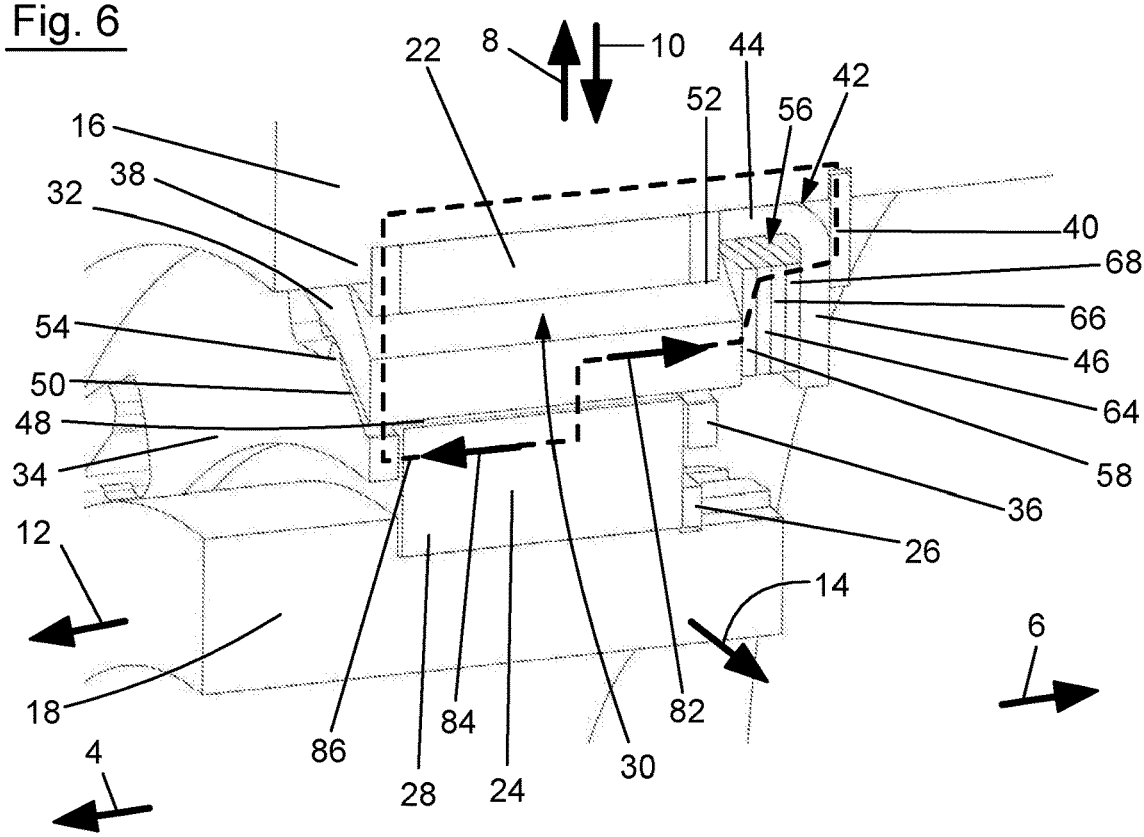
Figure 7:
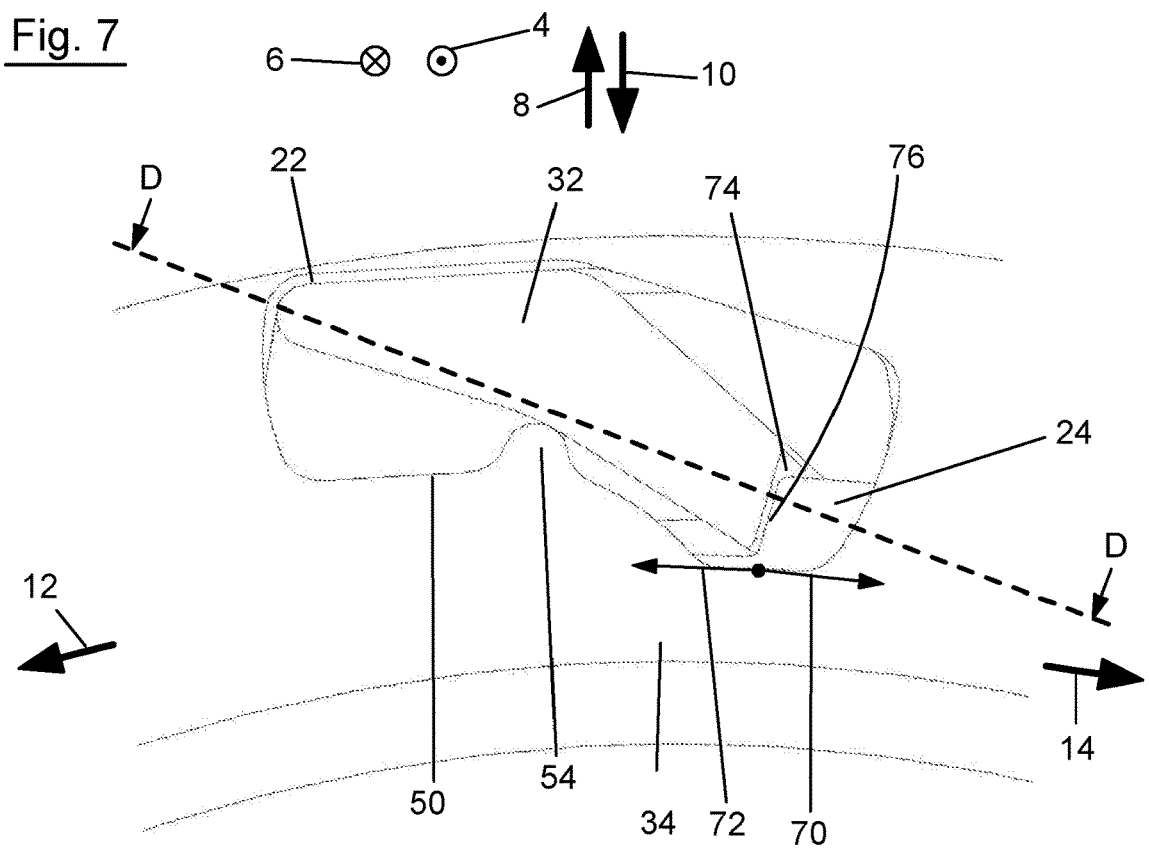
Figure 8:
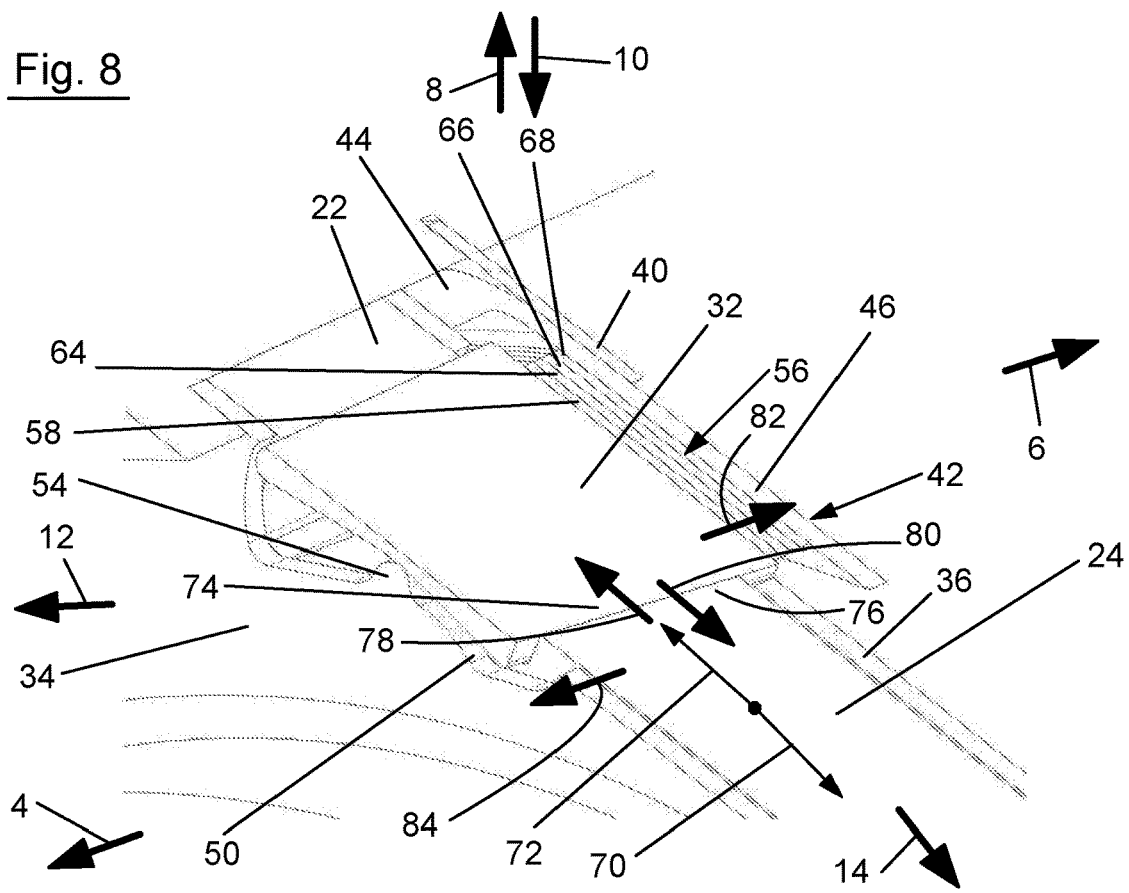
Figure 9:
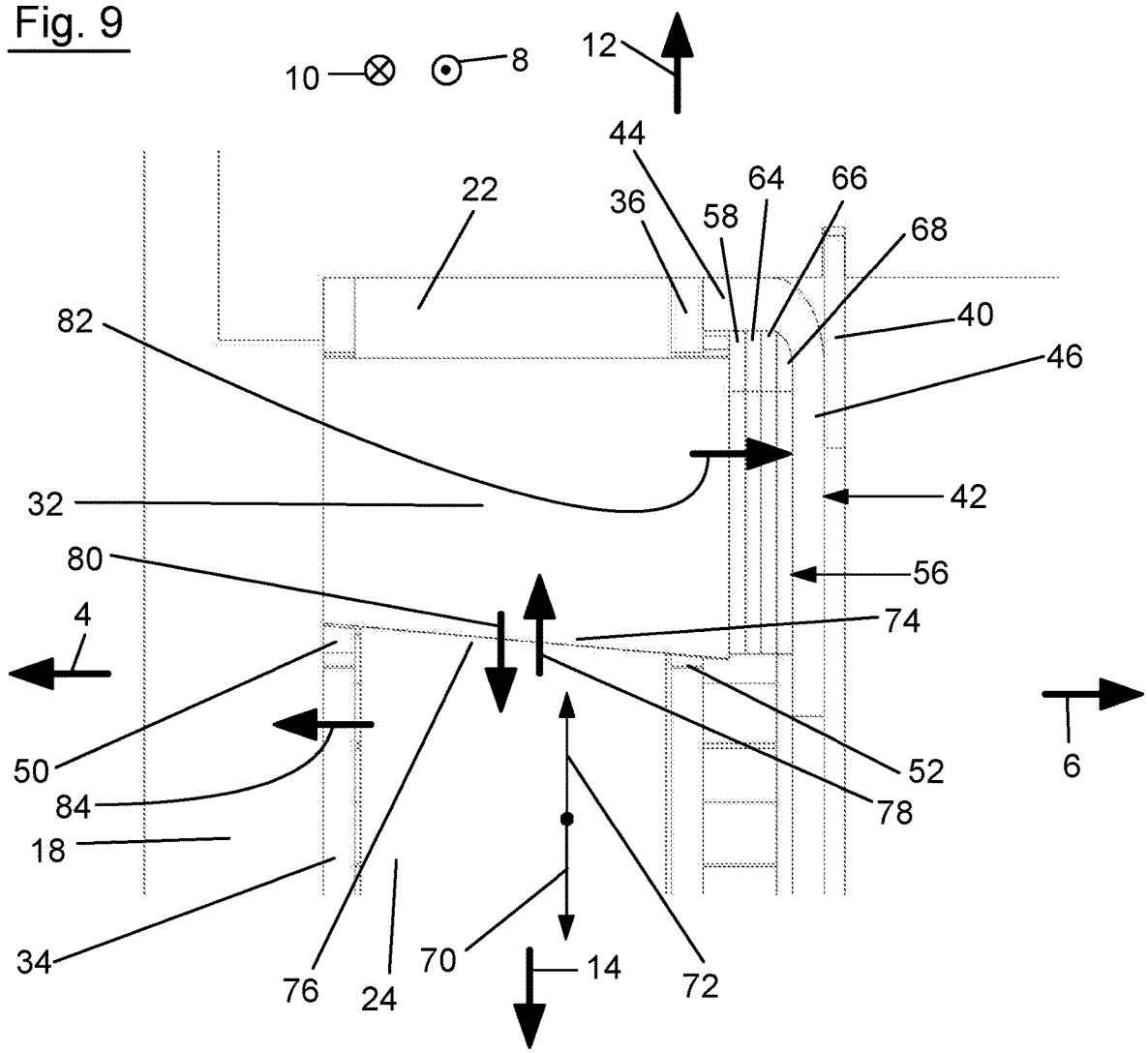

The invention will be subsequently described in greater detail with the aid of an exemplary embodiment with reference to the appended drawings. As shown in:

FIG. 1 a perspective depiction of a freewheel arrangement within a drivetrain comprising one embodiment of the freewheel according to the invention, FIG. 2 a partial perspective depiction of the freewheel arrangement from FIG. 1 with a cut along line A-A in FIG. 1 with the clamping element in the release position, FIG. 3 a partial cutaway view of the freewheel from FIGS. 1 and 2 with the clamping element in the release position, FIG. 4 a partial perspective depiction of the freewheel arrangement from FIGS. 2 through 3 with a cut along line B-B in FIG. 3, FIG. 5 a top view of the perspective depiction from FIG. 4, FIG. 6 a partial perspective depiction of the freewheel arrangement from FIG. 1 with a cut along line C-C in FIG. 1 with the clamping element in the locking position, FIG. 7 a partial cutaway view of the freewheel from FIGS. 1 and 6 with the clamping element in the locking position, FIG. 8 a partial perspective depiction of the freewheel from FIGS. 6 and 7 with a cut along line D-D in FIG. 7, and FIG. 9 a top view of the perspective depiction from FIG. 8.

FIG. 1 shows a freewheel arrangement 2 in a perspective depiction, wherein the opposite axial directions 4, 6, the opposite radial directions 8, 10, and the opposite circumferential directions 12, 14 are indicated by corresponding arrows. Freewheel arrangement 2 has an essentially annular first component 16 and an essentially annular second component 18, wherein first and second components 16, 18 may be coupled to one another in a rotary entrainment way via freewheel 20 lying therebetween in radial direction 8, 10.

Freewheel 20, which is preferably designed as a positive-locking clutch or ratchet freewheel, has a first race 22 and a second race 24. First race 22 is designed as an outer race, whereas second race 24 is designed as an inner race which is consequently surrounded outwardly in radial direction 8 by first race 22. First race 22 is in rotary driving connection with first component 16, whereas second race 24 is in rotary driving connection with second component 18. As is clear in FIG. 2, second race 24 is in rotary driving engagement with second component 18 via an inner toothing, wherein the inner toothing engages in an outer toothing on second component 18 for this purpose. Second race 24 is thereby fitted on second component 18 in axial direction 4, and is supported in axial direction 6 on second component 18 via a securing ring 26. In contrast, a stepped portion 28 is provided in axial direction 4, which will be discussed later in greater detail. First race 22 may likewise be in rotary driving connection with first component 16 via a spline.

A clamping gap 30 is designed in radial direction 8, 10 between first and second races 22, 24 extending in circumferential direction 12, 14, wherein multiple clamping elements 32 of freewheel 20, preferably distributed uniformly in circumferential direction 12, 14, are arranged within clamping gap 30. Clamping gap 30 is delimited in axial direction 4 at least partially by a first side wall 34, and in opposite axial direction 6 at least partially by a second side wall 36, wherein both side walls 34, 36 are essentially designed as annular disks and are designed extending in circumferential direction 12, 14. Both side walls 34, 36 are coupled rotationally fixed to first race 22, wherein this may be carried out, for example, by a direct fixing of side walls 34, 36 on first race 22. Alternatively, such a rotary entrainment coupling may also be carried out via a rotationally fixed arrangement of both first race 22 and also side walls 34, 36 on first component 16.

In the embodiment depicted, first side wall 34 is supported in axial direction 4 on a stepped portion 38 of first component 16. First race 22 follows first side wall 34 in axial direction 6, so that first race 22 is supported or supportable on stepped portion 38 via first side wall 34. In addition, second side wall 36, which is supported or supportable in axial direction 4 on stepped portion 38 via first race 22 and first side wall 34, follows in axial direction 6. In axial direction 6, the support of side walls 34, 36 and of first race 22 is carried out by means of a securing ring 40 on first component 16. This, however, is carried out by interposing a spring seat 42, which is designed extending essentially in circumferential direction 12, 14 and in profile has a first leg 44 extending in axial direction 4, 6 and a second leg 46 extending inward in radial direction 10 and connecting in axial direction 6 to first leg 44.

Clamping elements 32 are in rotary driving connection with first race 22 or are coupled in a rotary entrainment way to first race 22. Because freewheel 20 depicted in this case is a so-called ratchet freewheel, clamping elements 32 are designed as pawls, which are respectively pivotable about a longitudinal axis extending in axial directions 4, 6 between a release position, which is shown in particular in FIGS. 2 and 3, into a locking position, which is depicted in particular in FIGS. 6 and 7. For this purpose, a rotary driving contour with radial depressions 48, into which clamping elements 32 in the form of pawls may engage in the locking position, is provided on the side of second race 24 facing outward in radial direction 8 and facing clamping elements 32. Even if not depicted in greater detail, clamping elements 32 in the form of pawls are thereby preferably biased into the specified locking position.

As already indicated, clamping elements 32 in the form of pawls are arranged at least partially inside of clamping gap 30 between side walls 34, 36 lying opposite one another in axial direction 4, 6. Clamping elements 32 thereby extend in axial direction 4 in each case into a recess or a window 50 in first side wall 34, and in opposite axial direction 6 into a recess or a window 52 in second side wall 36. Thus, clamping elements in the form of pawls are both displaceable in axial direction 4, 6 within recesses 50, 52, and are also respectively pivotable about an axis extending in axial direction 4, 6 between the release position and the locking position. As is particularly clear from FIG. 3, the edge of recesses 50, 52 thereby has a projecting shoulder 54, which project into respective recess 50, 52 and on which shoulder clamping element 32 is propped up as a type of rocker, in order to achieve the pivotability of clamping element 32 within clamping gap 30 and within recesses 50, 52.

Previously mentioned spring seat 42 functions for accommodating or supporting a spring device 56, which functions for biasing clamping element 32 into an initial position into axial direction 4. Thus, clamping elements 32 may be displaced in axial direction 6, counter to the spring force of said spring device 56 acting in axial direction 4, from the initial position into a disengagement position, as this shall be discussed later in greater detail. Spring element 56 is thereby supported or supportable in axial direction 4 on clamping element 32 and directly or indirectly in opposite axial direction 6 on first race 22, wherein in this case an indirect support is shown, which is carried out via spring seat 42, securing ring 40, first component 16, stepped portion 38, and first side wall 34.

Specified spring device 56 has at least one annular wave spring 58, which is designed extending in circumferential direction 12, 14 and is designed as corrugated to produce wave peaks 60 projecting in axial direction 4 and wave troughs 62 projecting in axial direction 6. In each case, a wave peak 60 of wave spring 58 is thereby supported or supportable in axial direction on a respective clamping element 32. Stated more precisely: spring device 56 has in the embodiment shown, three additional wave springs 64, 66, 68, in addition to wave spring 58, which follow wave spring 58 in axial direction 6, wherein wave peaks and wave troughs 60, 62 of both wave springs 58, 64 are arranged aligned with one another in axial direction 4, 6. In the case of wave springs 66, 68, wave peaks and wave troughs 60, 62 are also respectively arranged aligned with one another in axial direction 4, 6; however, wave peaks 60 of wave spring 66, 68 are arranged aligned with wave troughs 62 of wave spring 58, 64 in axial direction 4, 6, whereas wave troughs 62 of wave spring 66, 68 are arranged aligned with wave peaks 60 of wave springs 58, 64 in axial direction 4, 6. Spring device 56, designed in this way, is arranged in spring seat 42 in axial direction 4, 6 between second side wall 36 and second leg 46 of spring seat 42, whereas first leg 44 surrounds wave springs 58, 64, 66, 68 outwardly in radial direction 8. Spring device 56 is thereby likewise in indirect rotary driving connection with first race 22 in order to assign wave peaks 60 of wave spring 58 consistently to clamping elements 32.

Freewheel 20 is designed in such a way that second race 24 may be rotated in a first direction of rotation 70 relative to first race 22 without coming into rotary entrainment coupling via clamping elements 32, which are located in their release position or are pressed into the release position by the relative rotation in first direction of rotation 70. This rotary driving decoupling, in which second race 24 is in first direction of rotation 70 rotated relative to first race 22, is shown in FIGS. 2 through 5. If, however, second race 24 is rotated in second direction of rotation 72 opposite first direction of rotation 70 relative to first race 22, then both races 22, 24 are coupled in a rotary entrainment way in a first rotational position relative to one another via clamping elements 32. However, clamping elements 32 may thereby be displaced in axial direction 6 from an initial position, as is shown in FIGS. 2 through 5, into a disengagement position, shown in FIGS. 6 through 9, by changing the specified relative rotational position between first and second race 22, 24, as this will be subsequently explained in greater detail.

If second race 24 is rotated in second direction of rotation 72 relative to first race 22, then clamping elements 32 initially pivot from the release position indicated in FIG. 3 into the locking position shown in FIG. 7, in which clamping elements 32 plunge inward in radial direction 10 into recesses 48 of the rotary driving contour on second race 24, wherein the pivot movement is traced back to the previously mentioned biasing of clamping elements 32 into their locking position. A rotary driving contour is thereby likewise provided on the inner side of first race 22, the other end of respective clamping element 32 engages in the recesses of this rotary driving contour in order to cause a positive locking rotary entrainment coupling between first and second race 22, 24. Axially-displaceable clamping elements 32 are thereby initially still located in their initial position, in which they are biased via spring device 56.

Due to manufacturing inaccuracies or tolerances during the production of clamping elements 32 and the rotary driving contours on races 22, 24, initially only some of clamping elements 32, if not merely one of clamping elements 32, is/are supported on second race 24 inside of the rotary driving contour in circumferential direction 14. In this state, first and second race 22, and 24 assume a first rotational position relative to one another, in which at least one certain rotary entrainment coupling is provided via some or one single clamping element 32 in their/its initial position. A support section 74 of supporting clamping element 32 is thereby supported on a support section 76 of second race 24. Both support sections 74, 76 are thereby aligned and/or sloped in such a way that a support force 78, 80 acting in direction of rotation 70 or 72 between support section 74 of clamping element 32 and support section 76 of second race 24 results at least partially in an axial force 82 acting on clamping element 32 to displace clamping element 32 in axial direction 6 into its disengagement position, which is shown in FIGS. 6 through 9. Support sections 74, 76 are thereby additionally designed in such a way that they are supported flat against one another both in the initial position and in the disengagement position. Due to the inclination mentioned, which may be gathered in particular from FIGS. 4 and 8, clamping element 32 is displaceable in a self-actuating way, or due to support forces 78, 80 acting between second race 24 and clamping element 32, in axial direction 6 from the initial position into the disengagement position according to FIGS. 6 through 9. The displacement in axial direction 6 is thereby carried out counter to the spring force of spring device 56, so that wave springs 58, 64, 66, 68 may be compressed while generating the later reset force in axial direction 4, 6, as this may be gathered, in particular, from FIGS. 6, 8, and 9.

In the context of the displacement of the previously solely supporting clamping element 32 into its disengagement position, second race 24 is also rotated farther in second direction of rotation 72 relative to first race 22, so that first and second race 22, 24 assume, in the disengagement position of at least one clamping element 32, a second rotational position relative to one another in which second race 24 is rotated farther in second direction of rotation 72 relative to first race 22 than in the first relative rotational position. This has the result that others of clamping elements 32 are also supportable on second race 24 via their support sections 74 in order to contribute to the rotary entrainment coupling and thus to unload the previously solely loaded clamping element 32. Consequently, despite the previously mentioned manufacturing tolerances, it is achieved by this means that more clamping elements 32 contribute to the rotary entrainment coupling, by which means clamping elements 32 may be dimensioned as smaller without having to fear damage to clamping elements 32 or races 22, 24.

In the embodiment depicted, it is additionally provided that second race 24 is likewise displaceable relative to first race 22 in axial direction 4 from a first axial position, according to FIGS. 2 through 5, into a second axial position, according to FIGS. 6 through 9, due to support force 78, 80 acting in direction of rotation 70 or 72 between second race 24 and clamping elements 32, so that second race 24 is supported or supportable in axial direction 4 in second axial position directly or indirectly, here indirectly, on first race 22. In the embodiment depicted, second race 24 is supported in axial direction 4 in its second axial position on first side wall 34, and thus indirectly on first race 22. Due to support forces 78, 80, second race 24 is thus displaced in axial direction 4, opposite to at least one clamping element 32, from the first into the second axial position.

As is indicated in FIG. 6, the axial force acting on the at least one clamping element 32 in the disengagement position and the opposite axial force acting on second race 24 in the second axial position establish a force circuit 86, which, starting from second race 24, runs across first side wall 34, stepped portion 38, first component 16, securing ring 40, spring seat 42, spring device 56, and clamping element 32 back to second race 24. Consequently, a closed power flow is achieved, which essentially makes a special axial support of first and second components 16, 18 unnecessary.

Supplementally, second race 24 may also be biased into the first axial position to cause a resetting of the same in the first axial position. A corresponding resetting or spring device might be provided or act, for example, in this case in axial direction 4, 6 on second component 18 between second race 24 and previously mentioned stepped portion 28, wherein second race 24 might be movable in axial direction 4, 6 relative to second component 18 between securing ring 26 and stepped portion 28.

REFERENCE SIGN LIST

2 Freewheel
4 Axial direction
6 Axial direction
8 Radial direction
10 Radial direction
12 Circumferential direction
14 Circumferential direction
16 First component
18 Second component
20 Freewheel
22 First race
24 Second race
26 Securing ring
28 Stepped portion
30 Clamping gap
32 Clamping elements
34 First side wall
36 Second side wall
38 Stepped portion
40 Securing ring
42 Spring seat
44 First leg
46 Second leg
48 Depressions
50 Recess
52 Recess
54 Projecting shoulder
56 Spring device
58 Wave spring
60 Wave peaks
62 Wave troughs
64 Wave spring
66 Wave spring
68 Wave spring
70 First direction of rotation
72 Second direction of rotation
74 Support section
76 Support section
75 Support force
80 Support force
82 Axial force
84 Axial force
86 Force circuit

The invention claimed is:

1. A freewheel (20) comprising a first race (22), a second race (24) rotatable relative to the first race (22) in a first direction of rotation (70), and clamping elements (32) between the first and second races (22, 24) which are in rotary driving connection with the first race (22), wherein, in a second direction of rotation (72) opposite the first direction of rotation (70), the second race (24) is coupled in a rotary entrainment way to the first race (22) in a relative rotation position via at least one of the clamping elements (32), characterized in that:

the at least one clamping element (32) is displaceable in axial direction (6) from an initial position into a disengagement position by changing the relative rotational position between the first and second races (22, 24), the at least one clamping element (32) is displaceable in a self-actuating way into the disengagement position and is displaceable into the disengagement position due to a support force (78, 80) acting between the first and/or second race (22; 24) and the clamping element (32), and a support section (74) of the at least one clamping element (32) is supported or supportable on a support section (76) of the first and/or second race (22; 24), wherein the support sections (74, 76) are inclined so that a support force (78, 80) acting in the direction of rotation (70, 72) between the at least one clamping element (32) and the respective race (22; 24) results at least partially in an axial force (82) acting on the at least one clamping element (32) to displace the at least one clamping element (32) into the disengagement position.

2. The freewheel (20) according to claim 1, characterized in that a spring device (56) is provided for biasing the at least one clamping element (32) into the initial position, and/or the at least one clamping element (32) is displaceable counter to the spring force of a spring device (56) from the initial position into the disengagement position.

3. The freewheel (20) according to claim 2, characterized in that the spring device (56) has at least one annular wave spring (58), wherein a wave peak (60) of the wave spring (58) projecting in the direction of the at least one clamping element (32) is assigned to the at least one clamping element (32), or in the case of multiple displaceable clamping elements (32), a respective wave peak (60) of the wave spring (58) is assigned in each case to a displaceable clamping element (32) of each of the multiple displaceable clamping elements (32).

4. The freewheel (20) according to claim 1, characterized in that the second race (24) is additionally displaceable relative to the first race (22) in axial direction (4) from a first axial position into a second axial position, due to a support force (78, 80) acting in direction of rotation (70, 72) between the second race (24) and the at least one clamping element (32), wherein the second race (24) is supported or supportable directly or indirectly on the first race (22) in the second axial position in axial direction (4).

5. The freewheel (20) according to claim 4, characterized in that the axial force (82), acting on the at least one clamping element (32) in the disengagement position, and the opposite axial force (84), acting on the second race (24) in the second axial position, establish a force circuit (86) via the first race (22) and/or a spring device (56).

6. The freewheel (20) according to claim 1, characterized in that the first and second races (22, 24) assume a first rotation position relative to one another in the initial position of the at least one clamping element (32) and assume a second rotational position relative to one another in the disengagement position of the at least one clamping element (32), in which second rotational position the second race (24) is rotated farther in the second direction of rotation (72) with respect to the first race (22) than in the first relative rotational position.

7. The freewheel (20) according to claim 1, characterized in that the freewheel (20) is designed as a ratchet freewheel, wherein the clamping elements (32) are preferably formed by pawls which are pivotable between a release position into a locking position in which the pawls engage in a rotary driving contour on the second race (24), and are biased into the locking position.

8. The freewheel (20) according to claim 7, characterized in that the pawls are arranged between two side walls (34, 36) lying axially opposite one another, and which are connected rotationally fixed to the first race (22), wherein the pawls extend in the axial direction (4, 6) into recesses (50, 52) in the two side walls (34, 36) in which the pawls are arranged pivotably and axially displaceably, and the displaceable second race (24) is supported or supportable in its second axial position preferably in axial direction (4) on one of the side walls (34, 36).

9. The freewheel (20) according to claim 1, wherein the support sections (74, 76) are supported or supportable flat against one another.

10. The freewheel (20) according to claim 2, wherein the spring device (56) is supported or supportable in axial direction (4, 6) on the one side on the clamping element (32) and on the other side directly or indirectly on the first race (22).

11. The freewheel (20) according to claim 3, wherein the wave spring (58) is in rotary driving connection with the first race (22).

12. The freewheel (20) according to claim 4, wherein the second race (24) is biased into the first axial position, and/or is displaceable from the first into the second axial position in axial direction (4) opposite to the at least one clamping element (32).

* * * * *